United States Patent [19]
Daly et al.

[11] Patent Number: 5,313,275
[45] Date of Patent: May 17, 1994

[54] CHROMA PROCESSOR INCLUDING A LOOK-UP TABLE OR MEMORY

[75] Inventors: Richard T. Daly; Robert N. Stabler; Paul C. Post; Randy Wiggins, all of Madison, Wis.

[73] Assignee: Colorgraphics Systems, Inc., Madison, Wis.

[21] Appl. No.: 954,366

[22] Filed: Sep. 30, 1992

[51] Int. Cl.[5] ............................................. H04N 9/74
[52] U.S. Cl. .................................. 348/592; 348/645; 348/649
[58] Field of Search .................. 358/21 R, 22, 22 CK, 358/29, 29 C, 26, 27, 28, 10, 37, 39, 40, 80, 183; H04N 9/75, 17/02, 9/74, 9/64

[56] References Cited

U.S. PATENT DOCUMENTS

| | | | |
|---|---|---|---|
| Re. 32,544 | 11/1987 | Korman | 358/28 |
| 4,096,523 | 6/1978 | Belmares-Sarabia | 358/80 |
| 4,240,104 | 12/1980 | Taylor et al. | 358/22 |
| 4,272,780 | 6/1981 | Belmares-Sarabia | 358/54 |
| 4,410,908 | 10/1983 | Belmares-Sarabia | 358/30 |
| 4,418,358 | 11/1983 | Poetsch et al. | 358/80 |
| 4,467,322 | 8/1984 | Bell | 358/27 |
| 4,597,006 | 6/1986 | Orsburn | 358/22 |
| 4,642,682 | 2/1987 | Orsburn et al. | 358/80 |
| 4,710,800 | 12/1987 | Fearing et al. | 358/22 |
| 4,727,412 | 2/1988 | Fearing et al. | 358/22 |
| 4,733,295 | 3/1988 | Hemsky et al. | 358/22 |
| 4,750,050 | 6/1988 | Belmares-Sarabia | 358/22 |
| 4,764,717 | 8/1988 | Tucker et al. | 323/364 |
| 4,782,384 | 11/1988 | Tucker et al. | 358/22 |
| 4,839,718 | 6/1989 | Hemsky et al. | 358/22 |
| 4,862,251 | 8/1989 | Belmares-Sarabia | 358/22 |
| 4,876,589 | 10/1989 | Orsburn et al. | 358/22 |
| 4,907,071 | 3/1990 | Belmares-Sarabia | 358/22 |
| 5,115,314 | 5/1992 | Ross | 358/183 |
| 5,216,493 | 6/1993 | DiBella et al. | 358/29 |

OTHER PUBLICATIONS

Encoding Parameters of Digital Television for Studios, CCIR REC. 601-2, 4 pages total, Jun. 1991.
Digital Chroma-Key, V. G. Devereux, BBC Research Department, UK, pp. 148-152. date not known.
Digital Production Switchers, Vellee et al., pp. 19-30 date not known.

Primary Examiner—James J. Groody
Assistant Examiner—Sherrie Hsia
Attorney, Agent, or Firm—Foley & Lardner

[57] ABSTRACT

Video systems generally include chroma processors. The chroma processor may be configured as a chroma keyer, a key signal generator or a color collector. The chroma processor includes dual input look-up tables which are loaded by a central processor. The dual input look-up tables may be read and written to simultaneously. The look-up tables are addressed by chrominance signals, luminance signals or key signals input into the chroma processor. The look-up tables provide an exceptionally fast apparatus and exceptionally flexible method of keying one or more simultaneous regions of the display based on one or more unique chroma/-luma combinations, new key signals, chrominance signals, and luminance signals. The chroma processor receives color modification parameters from a software user interface. Preferably, the chroma processor utilizes Y luminance signals, and U and V chrominance signals.

31 Claims, 6 Drawing Sheets

CHROMA PROCESSOR INCLUDING A LOOK-UP TABLE OR MEMORY

FIELD OF THE INVENTION

This invention relates to video systems, and in particular to digital chroma processors capable of performing keying functions and color correction functions.

BACKGROUND OF THE INVENTION

Video keying may be performed with high speed video switches ("keyers") which select between two picture sources (video signals) during one frame period. By selectively switching between video signals, a composite video image may be produced. Generally, a keyer includes a switch and circuitry for generating a control (key) signal for the switch. The keyer selects between video signals based upon the status of the key signal.

Developments in the design of keyers have allowed relatively sophisticated combinations of two video signals. For instance, it is known in the art to utilize a key signal which represents a ratio of the first signal to the second signal. This type of key signal can be a function of various criteria. This signal allows the transition between the two video signals to be softened. A softened transition provides a more realistic composite image and reduces problems such as aliasing.

Video signals are generally comprised of two color difference signals and a luma signal. These signals are interconvertible with RGB representations. Various other types of video signals may also be used to provide a picture. In video signals, the symbol Y represents the luminance value and the symbols U and V represent two chrominance values. Generally, the U and V components represent the axes of a two dimensional space called the color plane. The practical range of the Y, U and V signals is preferably from $-128$ to $+128$ Which represents $-3.5$ volts to $+3.5$ volts in the analog domain with 8 bits per sample per component. The available values are 0–255. As per CCIR 601-2, "Encoding Parameters of Digital Television for Studios" parameter #8, the luminance signal will have 220 quantization levels with the black level corresponding to level 16 and peak white corresponding to level 235. Each color difference signal will have 225 quantization levels in the center part of the quantization scale with zero signal corresponding to level 128. Under this specification (CCIR 601-2), the Y channel analog signal will be 0V at 16 and $+700$ mV (milli-volts) at 235. Each color difference signal will be 0V at 128 and a negative $-350$ mV at 16 and a positive $+350$ mV at 240.

In order to provide a key signal that represents ratios of the first signal to the second signal (a signal that is more than bi-level (ON/OFF)), the combination of the two video signals must be by means of a multiplicative computation rather than a simple switching operation. This type of key signal is sometimes called a matte signal.

A circuit for providing a key signal or matte signal is discussed in "The Digital Chroma-Key" by V. G. Devreux (BBC Research Department, U.K.). In this reference, the chroma processor derives a key signal from the U and V signals. The circuit utilizes analog components for providing a multiplicative computation which generates the key signal.

"Digital Production Switchers" by Jacques Vallee (Thompson Video Equipment) discloses a digital chroma processor. The digital chroma processor includes a chroma key generator which utilizes digital multipliers and adders to develop a key signal. Similarly, U.S. Pat. No. 4,240,104 issued to Taylor et al. on Dec. 16, 1980 discloses a chroma key generator which is coupled to the U and V inputs. The generator receives the U and V signals from the first video signals and digitally performs various arithmetic manipulations to create a key signal. These generators are disadvantageous because the arithmetic computations by digital components are often inherently slow and because the processors can only be used with a single region of the color spectrum without adding additional hardware components.

In addition to keying, chroma processors also may perform a color correction operation. This operation allows a user to select certain colors in a video scene and then substitute new colors for the selected colors. In this application, U and V signals representative of the selected colors are chosen and the chroma processor replaces the U and V signals with U and V signals representative of the substitute colors. Also, the chroma processor may allow the user to select certain Y, U and V signals and replace the selected signals with different Y, U and V signals.

In U.S. Pat. No. 4,096,523, the color correction operation is performed by arithmetic processors which generate different Y, U and V values. Other prior art systems such as U.S. Pat. No. 4,727,412 utilize analog devices for providing color correction.

Analog prior art chroma processors are expensive and have limited accuracy and flexibility. Analog equipment is prone to drift and recalibration. Conventional digital prior art systems cannot process key signals and color correction data for different color regions without additional hardware. Accordingly, to have a competitive and acceptable system it is important to produce a system which is flexible.

SUMMARY OF THE INVENTION

The present invention relates to a digital chroma processor for receiving first and second input chrominance signals. The chroma processor includes a means for selecting color modification parameters, a chrominance look-up table means, and a processing means. The chrominance look-up table means stores data representative of a plurality of first output chrominance signals and second chrominance signals where the look-up table means is configured to address data and output predefined output chrominance signals in response to application of the input first and second chrominance signals. The processing means configures the data representative of a plurality of the output chrominance signals in the look-up table in accordance with a set of color modification parameters and the input chrominance signals.

The present invention relates to a digital chroma processor for generating first key signals in response to first chrominance signals and second chrominance signals. The chroma processor includes the user interface means for selecting color modification parameters, a memory means, and a processing means. The processing means generates the first key signals in accordance with the selected color modification parameters. The processing means also loads the memory means with the first key signals. The memory means holds the first key signals for the plurality of the first and second chrominance signals, and provides the first key signals when addressed by the first and second chrominance signals.

The present invention also relates to a digital chroma processor for providing new luminance signals in response to first chrominance signals, second chrominance signals and luminance signals. The chroma processor includes means for generating color modification parameters, a first look-up table means, and a processing means. The first look-up table means stores the new luminance signals for a plurality of the first chrominance signals, second chrominance signals, and the luminance signals. The first look-up table means also provides the new luminance signals when addressed by the first and second chrominance signals and the luminance signals. The processing means generates the new luminance signals in accordance with the selected color correction parameters and loads the look-up table means with the new luminance signals.

The present invention also relates to a digital chroma processor including a first input for receiving first chrominance values, a second input for receiving second chrominance values, user interface, a processor and a memory. The processor is coupled to the user interface. The processor produces a new first chrominance value and a new second chrominance value for each first and second chrominance value in a set of first and second chrominance values in response to commands from the user interface. The memory has data outputs and address inputs and data inputs coupled to the processor. The memory stores the new first and new second chrominance values for each first and second chrominance value in the set of first and second chrominance values on the data input at memory locations addressed by corresponding ones of the first and second chrominance values of the set of the first and second chrominance values. The memory has second address inputs coupled to the first and second inputs for receiving the first and second chrominance values. The memory provides the new first and second chrominance values at the data output in response to the first and second chrominance values on the second address inputs.

The invention also relates to a digital chroma processor including a first input for receiving first chrominance values, a second input for receiving second chrominance values, a user interface, a processor and a memory. The processor is coupled to the user interface. The processor produces key values for each first and second chrominance value in a set of first and second chrominance values in response to commands from the user interface. The memory has data outputs and address inputs and data inputs coupled to the processor. The memory stores the key values for each first and second chrominance value in the set of first and second chrominance value on the data inputs at memory locations addressed by corresponding ones of the first and second chrominance values of the set of the first and second chrominance values. The memory has second addressed inputs coupled to the first and second inputs. The memory provides the key values at the data outputs in response to the first and second chrominance values on the second address inputs.

DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings in the several Figures, wherein like designations denote like elements, and wherein:

DETAILED DESCRIPTION OF THE DRAWINGS

Figure 1:
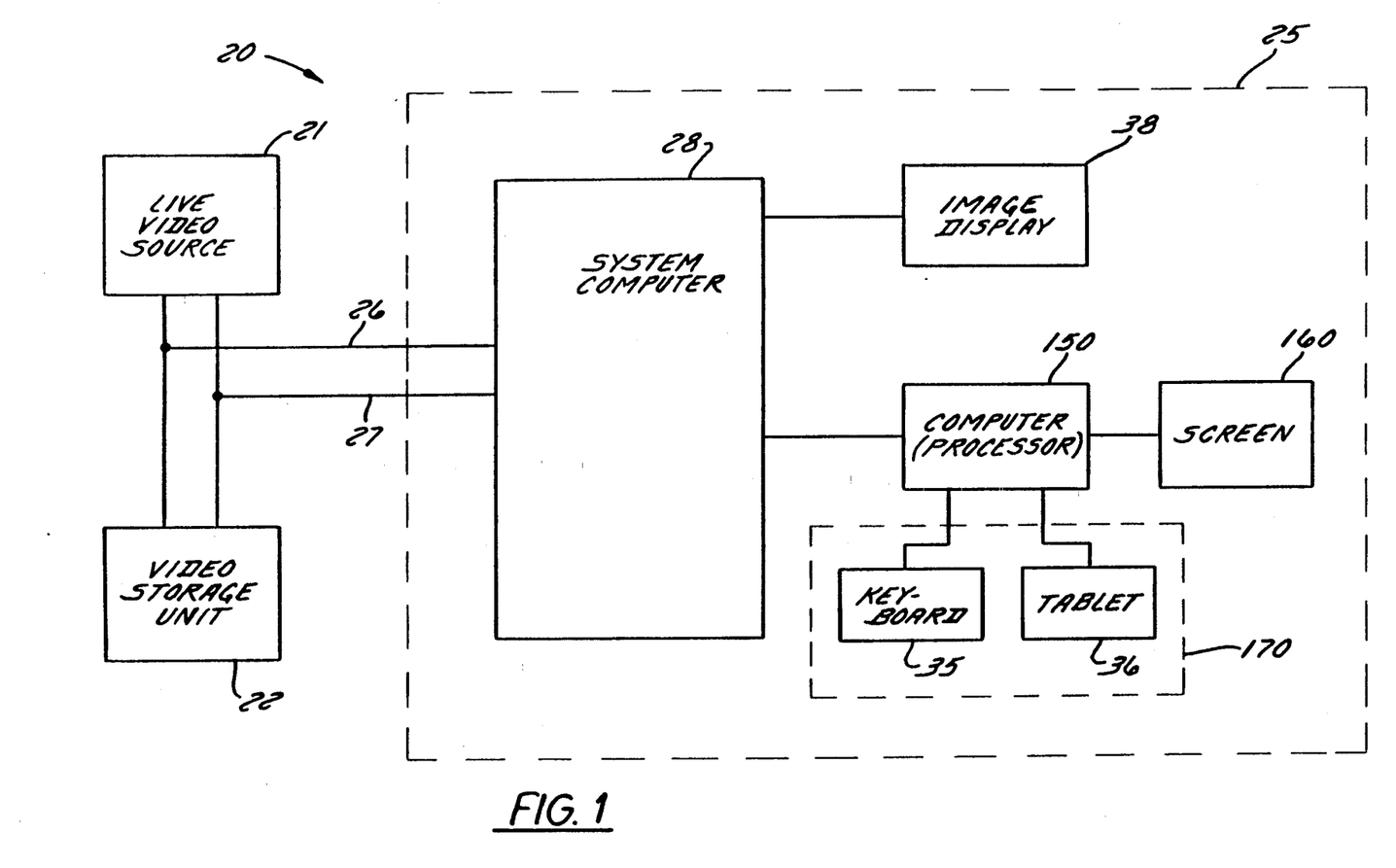
FIG. 1 is a block diagram of a video system in accordance with a preferred exemplary embodiment of the present invention.

FIG. 1 is a block diagram of a video system 20 in accordance with a preferred exemplary embodiment of the present invention. The video system 20 includes a live video source 21, a video storage unit 22, and a video processing system 25. The live video source 21, which may be a camera, is coupled to the system 25 and video storage unit 22 by a foreground bus 26 and a background bus 27. The video storage unit may be a hard disk, tape recorder, or other storage device.

The video processing system 25 includes a system computer 28, a function monitor or screen 160, a processor a computer 150, a user interface 170 and an image display 38. The user interface 170 includes a keyboard 35 and a tablet 36. The system computer 28 is coupled to the foreground bus 26 and the background bus 27. The system computer 28 is coupled to the image display 38. The system computer 28 is also coupled to the computer 150. The computer 150 is coupled to the screen 160, the keyboard 35, and the tablet 36. The computer 150 is preferably a 486 based AT computer. The system computer 28 preferably is an Intel® i860 processor which is part of the DP/MAX system manufactured by ColorGraphics of Madison, Wis.

In operation, the video system 20, receives a foreground image from the video storage unit 22, or the live video source 21 on the bus 26 and a background image from the live video source 21, or the storage unit 22 on the bus 27. The system computer 28 manipulates these signals in accordance with color modification parameters provided from the computer 150. The computer 150 utilizes the screen 160, the keyboard 35 and the tablet 36 in order to enter color modification parameters. The system computer 28 provides a composite image in accordance with the color modification parameters to the image display 38. With the exception of portions of the system computer 28, the video system 25 is preferably comprised of the DP/MAX system.

Figure 2:
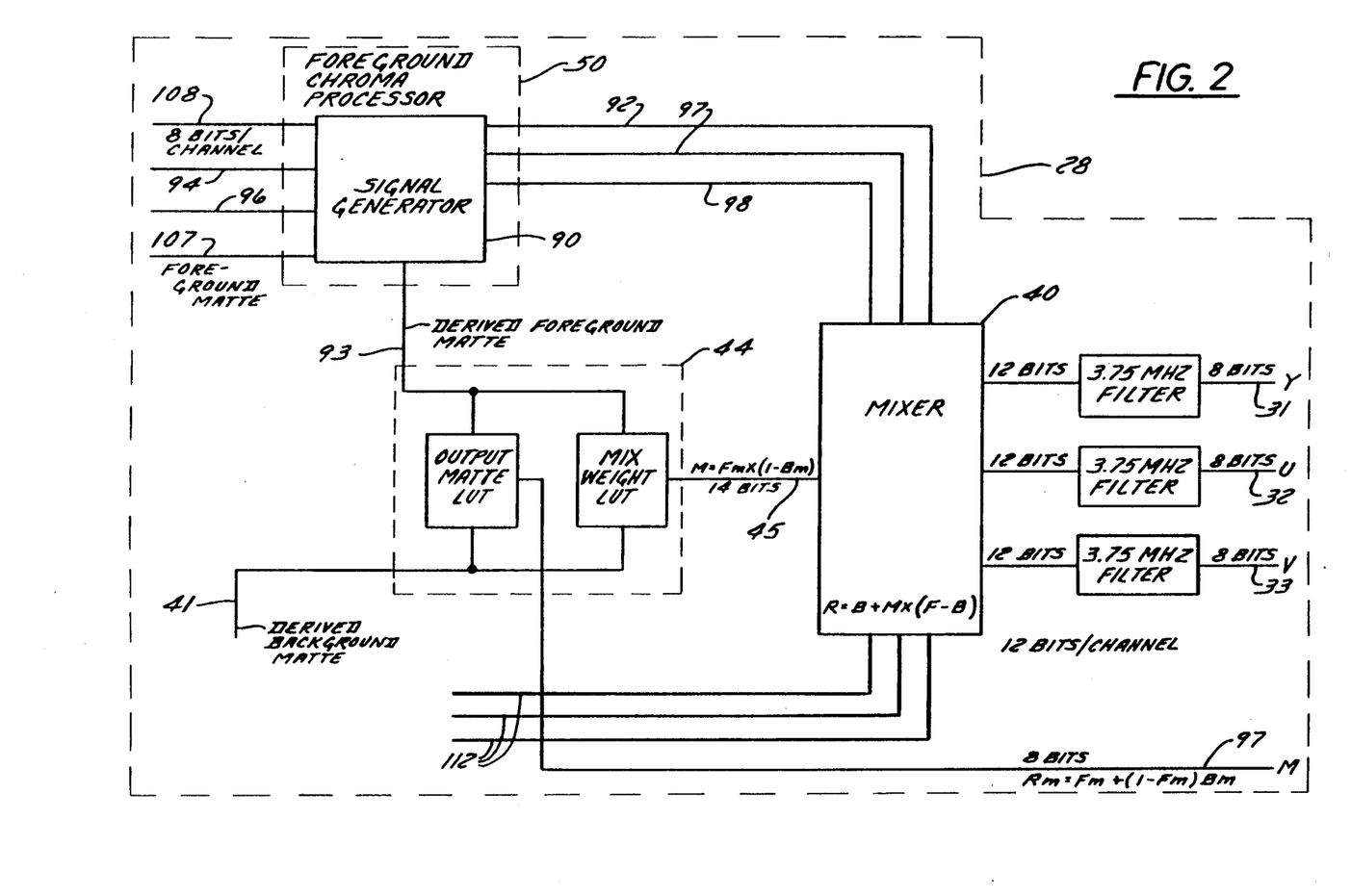
FIG. 2 is a block diagram of the system computer including a chroma processor configured in accordance with the preferred exemplary embodiment of the present invention.

With reference to FIG. 2, a block diagram of the system computer 28 includes a foreground chroma processor 50 and a mixer 40. The foreground chroma processor 50 is coupled to the mixer 40 by a luminance (Y) data bus 92, a first chrominance (U) data bus 97, and a second chrominance (V) data bus 98. A foreground matte data bus 93 couples the processor 50 to a matte signal adjustment circuit 44 which receives background matte signals from a data bus 41. The circuit 44 provides a dedicated processing unit for performing arithmetic functions on key signals produced by the processor 50 and on key signals on the bus 41. The circuit 44 provides key signals to the mixer 40 on a data bus 45. The circuit 44 is preferably a factory programmed set of PROM's which generates a "mixed" matte signal on the bus 10 based on foreground and background matte values. The mixer 40 receives luminance and chrominance signals from a background source on a data bus 42.

The foreground chroma processor 50 receives luminance signals on a Y data bus 108 and chrominance signals on a U data bus 94 and a V data bus 96 related to a foreground video image. The foreground chroma processor 50 also receives matte signals on a matte data bus 107. The foreground chroma processor 50 includes a signal generator 90 which provides the changed or new signals related to the foreground image on busses 92, 93, 97 and 98 to the mixer 40. The signals from the processor 50 and the bus 42 are applied to mixer 40 which produces a composite image on busses 31, 32, and 33 in accordance with a matte signal on the bus 47 for eventual reception by the image display 38 (FIG. 1) or other storage media (not shown).

Figure 3:
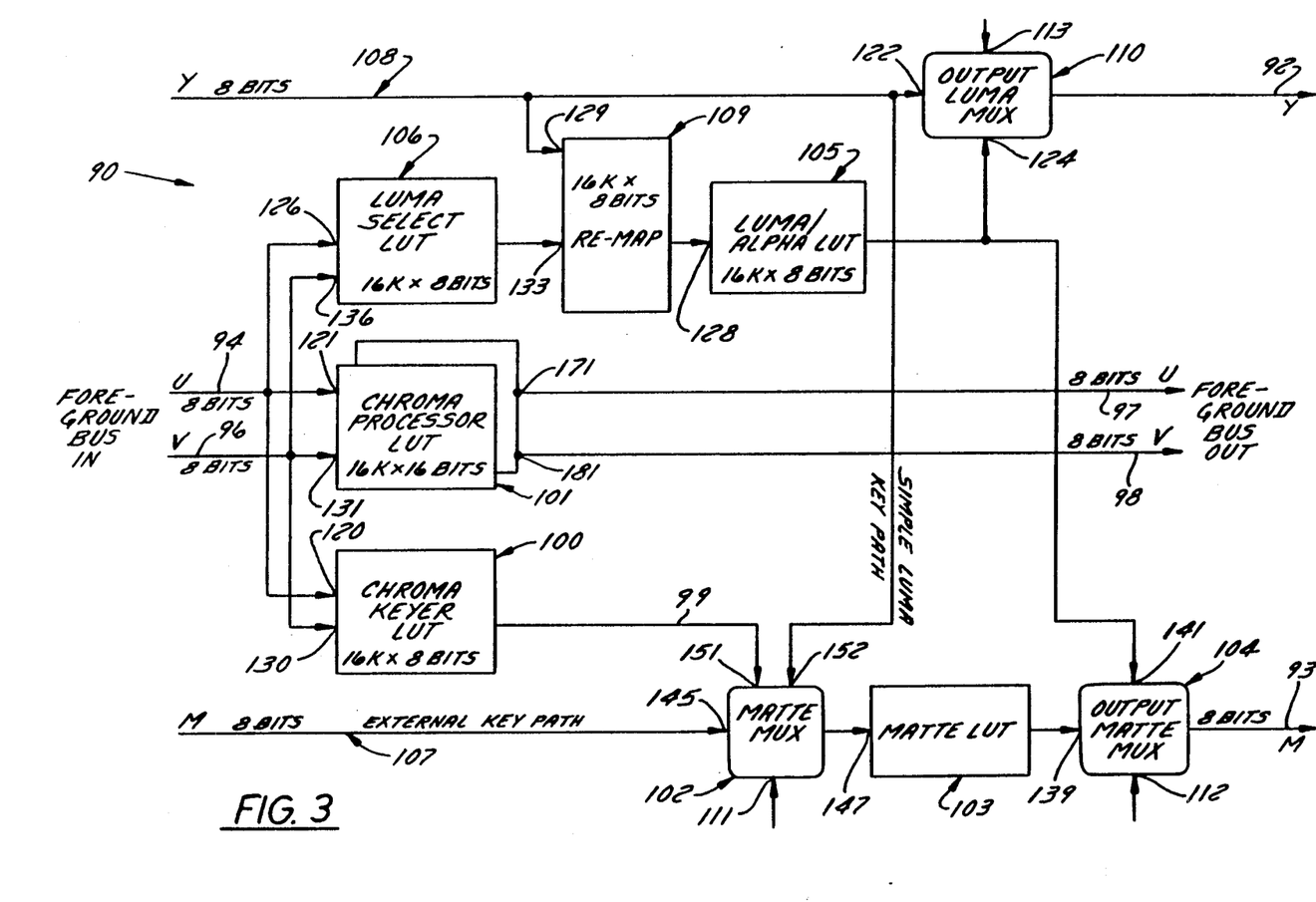
FIG. 3 is a block diagram of a portion of the chroma processor in accordance with the preferred exemplary embodiment of the present invention.

With reference to FIG. 3, the signal generator 90 for use in the chroma processor 50, configured in accordance with a preferred embodiment, includes a luma select look-up table 106, a chroma processor look-up table 101, a chroma keyer look-up table 100, an address configuration circuit 109, a luma/alpha look-up table 105, a matte multiplexer 102, a matte look-up table 103, an output matte multiplexer 104, and an output luma multiplexer 110. Digital luminance values are received on the Y bus 108 and conveyed on the Y bus 92. Digital matte signals or key signals are received on the matte bus 107 and conveyed on the matte bus 93. Chrominance values are received on the U bus 94 and the V bus 96. The chrominance values are conveyed on the U bus 97 and the V bus 98. The busses 92, 93, 97, and 98 are coupled to the mixer 40 (FIG. 2).

The U data bus 94 and the V data bus 96 are coupled to address inputs 126 and 136, respectively, on the luma select table 106. The U data bus 94 and the V data bus 96 are also coupled to address inputs 121 and 131, respectively on the chroma look-up table 101 and address inputs 120 and 130, respectively, on the chroma keyer look-up table 100. The Y data bus 108 is coupled to a first input 122 of the output luma multiplexer 110 and a first input 129 on the address reformatter 109 for conveyance of the digital luminance signals. The output of the luma select look-up table 106 is coupled to a second input 133 on the address reformatter 109, and the output of the address reformatter 109 is coupled to the address input 128 on the luma/alpha look-up table 105. The output of the luma/alpha look-up table 105 is coupled to a first input 141 on the output matte multiplexer 104 and a second input 124 on the output luma multiplexer 110. The matte bus 107 is coupled to a first input 145 on the matte multiplexer 102, and the output of the matte multiplexer 102 is coupled to an address input 147 on the matte look-up table 103. The output of the matte look-up table 103 is coupled to a second input 139 on the output matte multiplexer 104.

The output of the chroma keyer look-up table 100 is coupled to a bus 99 which is coupled to a second input 151 of the matte multiplexer 102, and a third input 152 of the matte multiplexer 102 is coupled to the Y bus 108. A first output 171 of the chroma look-up table 101 is coupled to the U bus 97 and a second output 181 of the chroma look-up table 101 is coupled to the V bus 98. The multiplexers 102, 104 and 110 include select inputs 111, 112, and 113, respectively, for receiving software control signals provided by the chroma processor 50.

The signal generator 90 preferably uses Y, U and V signals to represent the video signal. These signals may be expressed in terms red, green and blue/RGB signals which are related by the equations $Y=0.59G+0.3R+0.11B$, $U=B-Y$ and $V=R-Y$. A video signal having a format Y, U, and V is advantageous because it may be viewed on a black and white receiver without modification. Another advantage is that the human visual system is less sensitive to changes in color than to changes in brightness. Accordingly, for a given bandwidth the portion of the bandwidth needed to transmit the color portion of the signal may be readily reduced in favor of increasing the portion bandwidth used for luminance, i.e., luminance (Y) itself is a component.

The luma select look-up table 106 and the chroma keyer look-up table 100 are each preferably configured as a 16K by 8-bit look-up tables. The seven most significant bits of the U bus 94 and V bus 96 are concatenated to form a 14 bit index for each of the look-up tables 100 and 106. The 8-bit key values stored in the table 100 are conveyed by the bus 99 to the matte multiplexer 102. The 8-bit key values stored by the table 106 are provided to the address reformatter 109.

The chroma processor look-up table 101 is two 16K by 8-bit look-up tables configured as a 16K by 16-bit look-up table which is indexed similarly to the tables 100 and 106. The 16-bit stored values in the table 101 are treated as two 8-bit values that provide remapped or different chroma components. The different chroma components or signals are provided on the U bus 97 and the V bus 98.

The luma/alpha look-up table 105 is a 16K by 8-bit table which stores key values or luminance values, depending upon the application. The table 105 may be indexed by the address reformatter 109 in one of two ways. In the first way, the index is formed by concatenating the eight bits of the Y bus 108 with the six most significant bits of the luma select look-up table 106. In the second way, the index is formed by concatenating the six most significant bits of the Y bus 108 with the eight bits of the luma select look-up table 106. Therefore, the contents of the luma/alpha look-up table 105 may be thought of as sixty-four 256 byte tables or two hundred fifty-six 64 byte tables. In a chroma keying application, the table 105 provides the 8-bit key value to the multiplexer 104. In a color correction application or a flare suppression, the table 105 provides the 8-bit luminance value to the multiplexer 110.

The signal generator 90 operates to change any of the chrominance signals, the luminance signal, or the matte signal or combinations thereof. Particularly, the look-up tables 100, 101, 103, 105 and 106 output various sets of data which produce signals in response to input signals. The data in tables 100, 101, 103, 105 and 106 is addressable by input signals to produce output signals at various address locations. There is no requirement that the input and output signal are any particular function of each other. For example, if the signal generator 90 is configured to change the color which has a U chrominance value of 250 and a V chrominance value of 100 to a new color which has a U chrominance value of 200 and a V chrominance value of 125, the chroma processor look-up table 101 would be loaded with the U chrominance value 200 and the V chrominance value 125 at the memory location addressed by the V chrominance value 100 and the U chrominance value 250. Of course, the look-up table 101 may be loaded with any ranges of values for colors similar to the color to be changed.

In another example, if the signal generator 90 is configured to generate a key signal for a foreground image which has a green background, the chroma keyer look-up table 100 is loaded with high key values (close to 1, represented by a digital value 255) for memory locations which are addressed by U and V values which represent non-green colors and low key values (close to 0, represented by a digital value of 16 or less) for memory locations which are addressed by U and V values which represent the green color. Therefore, the signal generator 90 advantageously provides output key signals and output chrominance and luminance signals without utilizing a multiplicity of components comprising generally slower arithmetic digital circuits. Additionally, the output key and chrominance signals do not have to be any particular function of the input signals. More specifically, the look-up tables 100, 101, 103, 105 and 106 can be configured to produce any output signal in response to a particular input signal or generate different signals simultaneously without additional computer elements. For example, the tables 100, 101, 103, 105 and 106 could be configured to produce only one signal for all input signals, or configured to make the input signals equal to the output signals.

OPERATION AS A KEY SIGNAL GENERATOR

The signal generator 90 may be configured to operate as a key signal or matte signal generator. In this application, the signal generator 90 may generate a key signal from the key signal on the bus 107, the luminance signal on the bus 108, or the chrominance signals on the busses 94 and 96. A foreground video signal F is comprised of a luminance signal on the Y bus 108 and chrominance signals on the U bus 94 and the V bus 96. The matte signal, also known as the alpha, key or K signal on the bus 93, represents a ratio for combining foreground and background images. The foreground video signal (F) may be combined to a background video signal (B) by the following equation:

$$R = (F \times K) + (B \times (1 - K))$$

where R is the resulting composited video signal, F is the foreground video signal, B is the background video signal, and K is the key signal. As discussed above, the K value allows the mixer 40 to more realistically combine the foreground and background signals.

With reference to FIGS. 2 and 3, the foreground video signal is provided at the Y bus 108, the U bus 94, and the V bus 96. The background video image is provided at the bus 42. Preferably, the mixer 40 utilizes the matte signal on the bus 93 for combining the foreground and background video images signal.

The signal generator 90 may be configured in various ways to provide a key signal in response to signals. For example, software, by enabling various data pathways and loading the appropriate look-up tables 106, 100, 105 and 103, the signal generator 90 may either pass through the key signal on the bus 107 or may derive a matte signal from any combination of the key, Y, U and V signals. For example, the signal generator 90 may allow the key signal on the bus 107 to be conveyed on the bus 93, may change the key signal on the bus 107, may allow the luminance signal on the bus 108 to pass through as the key signal on the bus 93, or may derive a key signal from the chrominance and luminance signals. More particularly, the signal generator 90 may be configured as a straight chroma keyer or a chroma/luma keyer.

Generally, the table 103 is not used in the chroma keyer, chroma/luma keyer and color corrector applications. The signal generator 90 of the chroma processor 50 allows the key signal on the bus 107 to pass through to the bus 93 when the matte multiplexer 102 enables the first input and the matte look-up table 103 is configured to produce an identity function. Generally, the identity function provides an output equal to the address inputs provided to the look-up table. Thus, the key signal input to the address inputs of the matte look-up table 103 is provided to the output matte multiplexer 104. The output matte multiplexer 104 provides the signal on the input 139 to the bus 93. Software control signals from the processor enable the matte multiplexers for the appropriate outputs. Software in the processor 50 also loads the matte look-up table 103 for the identity function.

The matte look-up table 103 may also be used to provide an inverse function for the key signal. In this case, the key signal provided at the bus 107 addresses the matte look-up table 103, and the matte look-up table 103 provides an inverse key signal to the output matte multiplexer 104. This inverse signal is provided to the bus 93.

The software may change the key signal in accordance with various other programs. For example, the table 103 could be utilized to manipulate the gain or the lift of the key signal. This is an advantage over conventional systems which must utilize a dedicated adder and multiplier for these functions.

CHROMA KEYER

When the signal generator 90 is implemented as a straight chroma keyer, the key signal is a function of chrominance signals alone. The chroma keyer look-up table 100 is loaded with key signals. The chroma keyer look-up table 100 is addressed by the chrominance values on the U bus 94 and the V bus 96. The chroma keyer look-up table 100 provides an output in response to the chrominance value addresses provided to the look-up table. The output is a matte or key signal which is provided to the second input on the matte multiplexer 102. As described above, the processor 50 controls the matte multiplexer 102 so that it applies the signal from the chroma keyer look-up table 100 to the matte look-up table 103. The output matte multiplexer 104 applies the signal from the matte look-up table 103 to the matte bus 93. The matte look-up table 103 is loaded with data to produce an identity function and output the same signal that was output by the chroma keyer look-up table 100 to the output matte multiplexer 104.

A particular application used when the signal generator 90 of the chroma processor 50 is operated as a chroma keyer is referred to as flare suppression. Flare suppression is a particular application for changing the colors of particular U and V values. For example, when an object is pictured in front of a green background, the green background often bleeds through the object, or reflects onto the object. This bleeding through and reflection of green should be removed to provide a more realistic and more accurate picture. The technique for removing this green is referred to as flare suppression.

In flare suppression applications, the chrominance processor look-up table 101 is loaded with new U and V values. This allows the colors polluted by flare to be changed to colors represented by new chrominance values. The table 101 provides the new pairs of the chrominance values on busses 97 and 98.

The luminance values are also remapped in order to permit the removal of colors polluted by flare. The luma select look-up table 106 is loaded to determine which of 64 possible luminance remappings is used based upon the chrominance pair V. There are 64 possible tables of the polluted color because the address reformatter 109 is set to use the 6 high order bits from the table 106. The luma/alpha table is loaded with new luminance values for the U and V pair and the 8 high order bits from the bus 108. The output luma multiplexer 110 enables the luminance signal from the table 105. Therefore, when implemented as a chroma keyer with flare suppression, the signal generator 90 provides key signals from the table 100 on the bus 93, new chrominance signals on the busses 97 and 98, and new luminance signals on the bus 92.

CHROMA/LUMA KEY

The signal generator 90 may also operate as a chroma/luma keyer which creates key signals in response to chrominance signals on the busses 94 and 96 and luminance signals on the bus 108. In this application, the output matte multiplexer 104 selects the input 141 coupled to the luma/alpha look-up table 105. The luma select look-up table 106 is loaded with similar values to the key values used when loading the chroma keyer look-up table 100 discussed above. The luma/alpha look-up table 105 is also loaded with keying data. The address reformatter 109 is set to receive 6 bits from the Y bus 108 and 8 bits from the luma select look-up table 106. Therefore, the contents of the luma/alpha look-up table 105 may be thought of as sixty-four 256 byte tables, with the upper 6 bits of the Y bus 108 selecting a table and the 8 bits from the luma select look-up table 106 providing the index to that particular table. Thus, there is a separate remapping function for sixty-four luminance ranges.

Portions of the video signal with identical chrominance signals and different luminances can produce different key values if the 64 tables are loaded with different values. Loading all 64 tables with identical values produces the identical chroma key function as described with reference to the chroma keyer look-up table 100.

The table 105 applies the key signals, derived from the luminance and chrominance signals, to the output multiplexer 104. The multiplexer 104 is used instead of multiplexer 102 so that the path for the key signals includes the same number of look-up table delays as the key signals from the table 100. The table 101 is also loaded in accordance with the flare suppression function discussed above. Of course, the luminance signals are not changed because the tables 105 and 106 are used for the keying function.

COLOR CORRECTOR

With reference to FIG. 3, the signal generator 90 may also be configured as a color corrector. In the color corrector application, the operator 90 may be operated to change or correct U, V and Y signals. The generator 90 is configured similar to the chroma keyer discussed above; however, the multiplexer 102 passes the key signal from the bus 107 and the table 100 is not used.

When the generator 90 is configured to correct U and V signals, the look-up table 101 is loaded with new U and V values at all memory locations addressed by the U and V values of the color to be changed. The table 101 provides the different U and V values on the busses 97 and 98. The table 101 is loaded with the identity function for all U and V values which should not be changed.

When the signal generator 90 is configured to correct Y, U and V values, the luma select look-up table 106 and the luma/alpha look-up table 105 are loaded with data representing the new luminance values and the table 101 is loaded as described above. The address reformatter 109 is preferably set to receive 8 bits from the Y bus 108 and 6 bits from the luma select look-up table 106. Thus, every U and V pair may be assigned one of 64 luminance remapping functions by loading the luma select look-up table 106 with the desired function for each pair. Similar to the chroma keyer described above, if the look-up tables 106 and 105 represent identity functions, the Y signal passes through the chroma processor 50 unchanged. Therefore, the look-up tables 106 and 105 operate to provide a different luminance value on the bus 92 for every Y, U, and V combination which is selected for color correction.

The output luma multiplexer 110 should select the output of the luma/alpha look-up table for the color corrected luminance output on the Y bus 92. Further, the mixer 40 should receive the color corrected values on the U bus 97 and the V bus 98.

THE LOADING OF THE LOOK-UP TABLES

Figure 4:
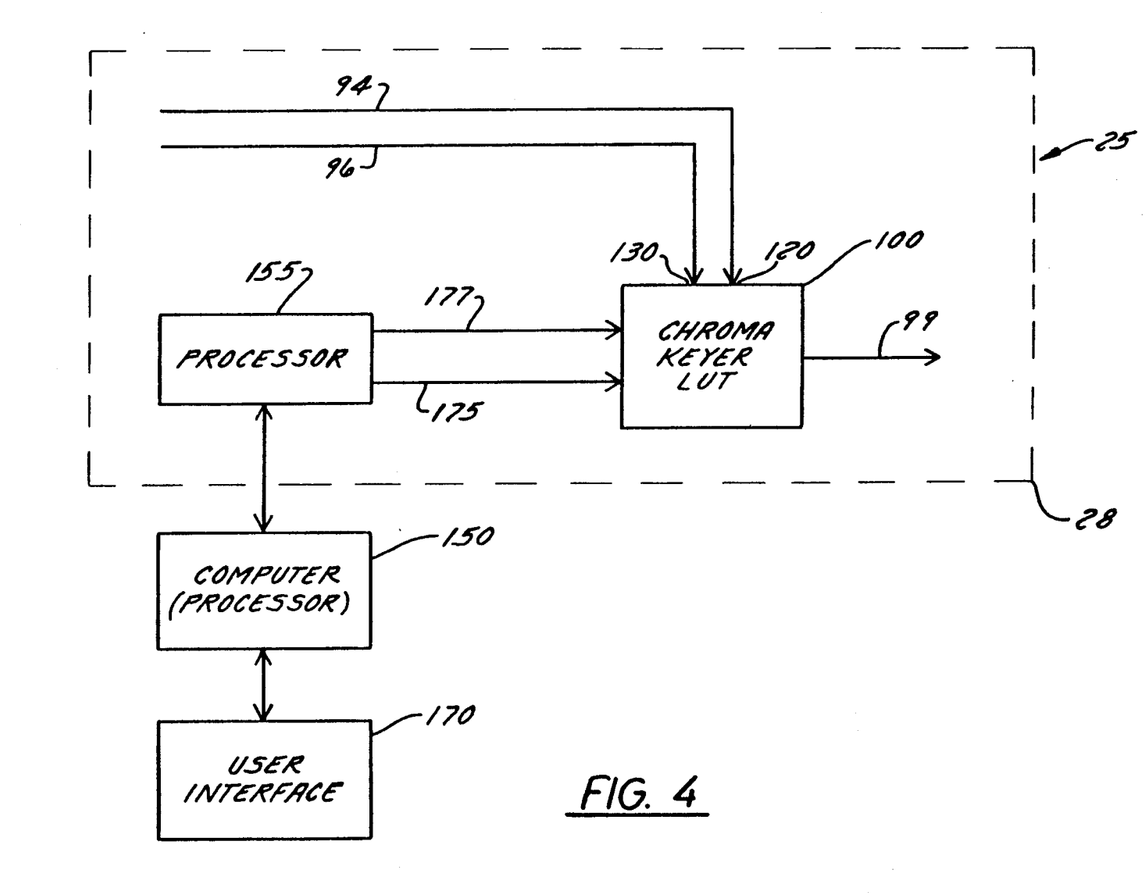
FIG. 4 is a block diagram which illustrates the manner in which the look-up tables are loaded in accordance with a preferred embodiment of the present invention.

FIG. 4 is a block diagram illustrating the manner in which the look-up tables in the signal generator 90 are loaded. The filling of the look-up table 100 is explained with reference to FIG. 4. The filling of table 100 is similar to the filling of the look-up tables 101, 103, 105 and 106. The processor 150 is also coupled to a screen 160 and a user interface 170. The processor 150 is also coupled to a processor 155 in the system computer 28 which is coupled to the look-up table 100 via a data input bus 175 and an address bus 177. Preferably, the processor 150 is an Intel 486 based computer with an AT architecture and ISA bus architecture and the processor 155 is an Intel i860 processor.

The look-up table 100 also receives chrominance signals at the address inputs 130 and 120 from the U bus 94 and the V bus 96. The look-up table 100 provides data to various circuit components such as the matte multiplexer 102 via the bus 99 discussed above with reference to FIG. 3.

The user interface 170 preferably provides controls for selecting chrominance and luminance values which may be keyed in, as well as softness and flare suppression controls. The processor 150 manages the user interface 170. The user interface 170 and the screen 160 are described below with reference to FIGS. 5 and 6. The key values for the chroma keyer look-up table 100 are calculated by the processor 155 in response to application software and color modification parameters provided by the user interface 170.

In response to the software, the processor 155 addresses the look-up table 100 on the address bus 177.

The processor 155 provides the key signal value on the data bus 175. In response to these signals, the look-up table 100 stores the key value for the particular U and V chrominance pair. The processor 155 repeats this procedure for all possible chrominance pairs.

Since the chrominance values (U, V) are each 8-bit values, the processor 150 calculates 65,536 key values ($256^2$). The key values are preferably 8-bit values. Only the most significant 7 bits of the U and V signals may be used in order to reduce the number of calculations and memory required. For the table 101 (FIG. 3), the least significant bit of the U and V signals may simply be passed through the table 101 unchanged. The look-up table 100 is preferably configured as a dual input SRAM (Dual Port) so that data may be loaded by the processor 155 and conveyed by the look-up table at the bus 99 simultaneously. The look-up table 100 is preferably comprised of two IDT 7006 manufactured by Integrated Device Technology, Inc. The look-up tables 100, 105, and 106 are preferably an IDT 7006 and the look-up table 103 is preferably an IDT 7140, both manufactured by Integrated Device Technology, Inc. Thus, as the look-up table 100 is being loaded with key values, the signal generator 90 may provide key values simultaneously at the bus output 93.

The simultaneous loading and reading of the chroma keyer look-up table 100 allows for real time interaction for change of operation. The chroma look-up table 101, the luma select look-up table 106, the luma/alpha look-up table 105 and the matte look-up table 103 are loaded by the processor 150 in a similar manner. However, different application software may be utilized for each look-up table. For instance, since the chroma look-up table 101 is utilized for color correction operations, a color correction algorithm is used by the processor 150 to load the look-up table 101. Further, since the luma select look-up table 106 and the luma/alpha look-up table 105 provide key values for chrominance values and luminance values, the processor 150 loads the luma-/alpha look-up table and the luma select look-up table 106 in accordance with these criteria. Further still, the processor 150 may change key values by providing new key values in the matte look-up table 103 in accordance with softness and flare suppression parameters provided by the interface 170.

SOFTWARE INTERFACE FOR A KEY SIGNAL GENERATOR

Figure 5:
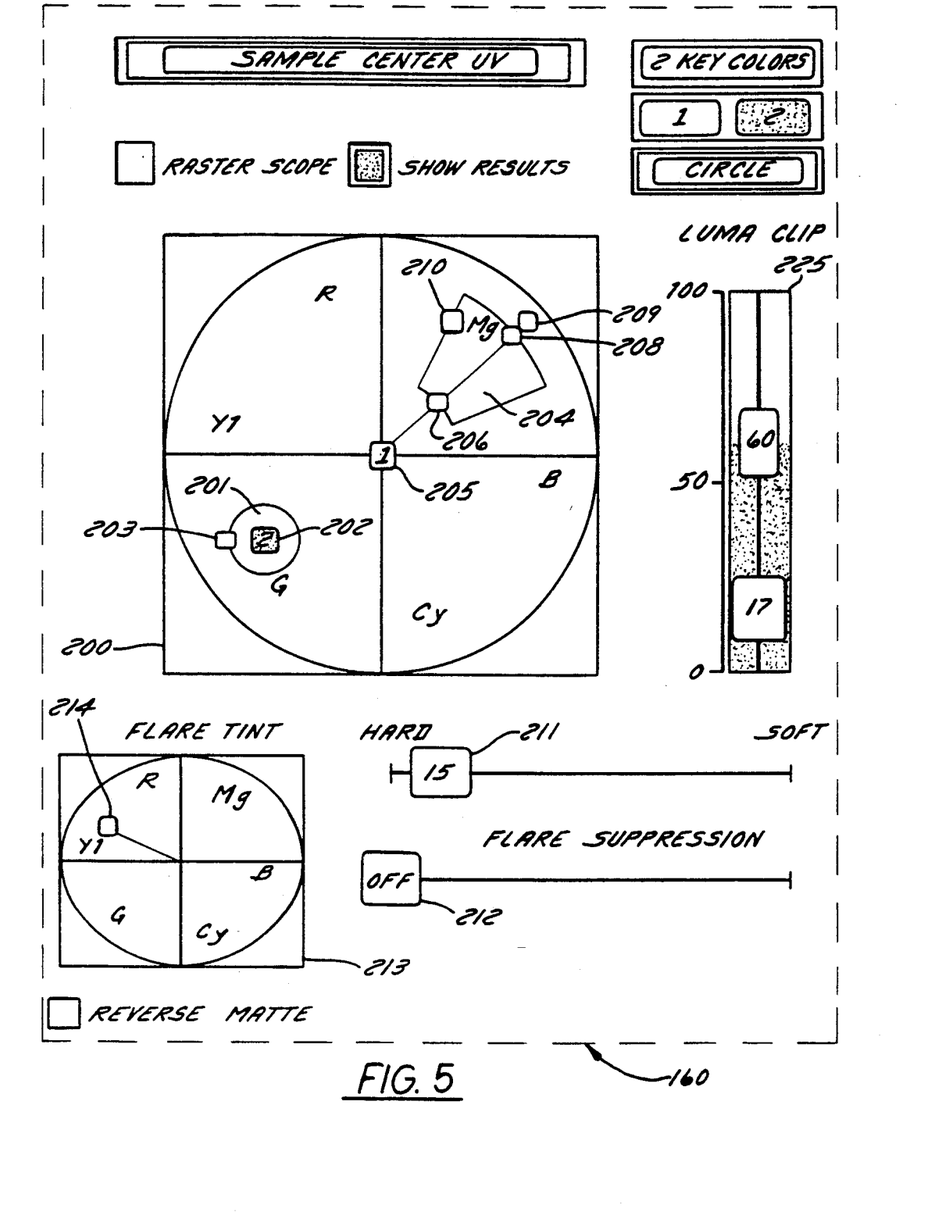
FIG. 5 is a first schematic drawing of a software user interface including a vector scope in accordance with features of the present invention.

With reference to FIG. 5, a schematic drawing of a vector scope display 200 displayed on the screen 160 is utilized for providing color modification parameters in chroma keying applications. Color modification parameters are flare suppression parameters, softness parameters, U values, V values, or Y values. The horizontal and vertical axes of the display 200 correspond to the U and V chrominance components. Up to approximately five regions may be freely located in the color space represented by the vector scope 200. Each region may be either a circular region 201 or a wedge shaped region 204. For circular regions, the controls are an origin 202 and a radius 203. For wedge regions, the controls are origin 205, a main angle 209, a sub-angle 210, an inner radius 206 and an outer radius 208.

The various controls are set by manipulating a user interface 170, shown with reference to FIG. 4. The user interface 170 may be a pen, tablet, mouse, track ball or various other hardware for providing controls. The screen 160 further provides a softness control 211 and a flare suppression control 212 which may change the parameters in the above regions. A separate vector scope 213 is provided to designate U and V components, such as U and V components 214, to selectively change the chroma components of the video signal.

U and V pairs of chrominance values which fall inside any of the regions specified by the user, such as the regions 201 and 204, produce the lowest alpha value or key value. Pairs falling outside the regions produce a range of alpha values depending on the type of region (circle or wedge) and the value of the distance parameter. The distance parameter is dependent on the softness parameter controlled by softness control 211 in key generation applications and is dependent on the flare suppression parameter controlled by flare suppression control 212 for flare suppression applications. For circular regions, this distance parameter is the geometric distance of the U and V pair from the origin 202. For wedge regions, the distance refers to the angle between the U and V pair and the origin 205 and the inner and outer radius values 207 and 208. Preferably, each region 201 or 204 has its own flare suppression parameters and softness parameters which may be set by the softness control 211 and the flare suppression control 212. Further, a luma clip control 225 allows clipping criteria to be selected.

Application software in accordance with a preferred embodiment for generating a key signal is shown in Appendixes A and B. The software is written in C language. The software in Appendix A includes a program for calculating alpha values or key values for all chrominance pairs in a circular region, and the software in Appendix B includes a program for computing the key values for chrominance pairs in a wedge shaped region. The program may be run on a microprocessor such as the 486 family of microprocessors.

In a flare suppression application, the processor 150 computes two 16K tables of 8-bit values. The table 100 is loaded with the first table which represents a key signal, and the table 101 is loaded with the second table which represents new chrominance values in accordance with flare suppression parameters. The chroma processor look-up table 101 remaps all the possible U and V pairs and provides new U and V pairs, permitting very selective color modification or removal of unwanted color reflections for the flare suppression function. Each U and V pair is remapped to a new U and V pair by interpolating from the "flare tint" or U and V values of the color shown at a point 214 in vector scope 213. The resulting U and V values are loaded into the look-up table 101. In this way, chrominance values that fall within the range controlled by the user may be remapped to a more desirable color.

SOFTWARE INTERFACE FOR THE COLOR CORRECTOR

Figure 6:
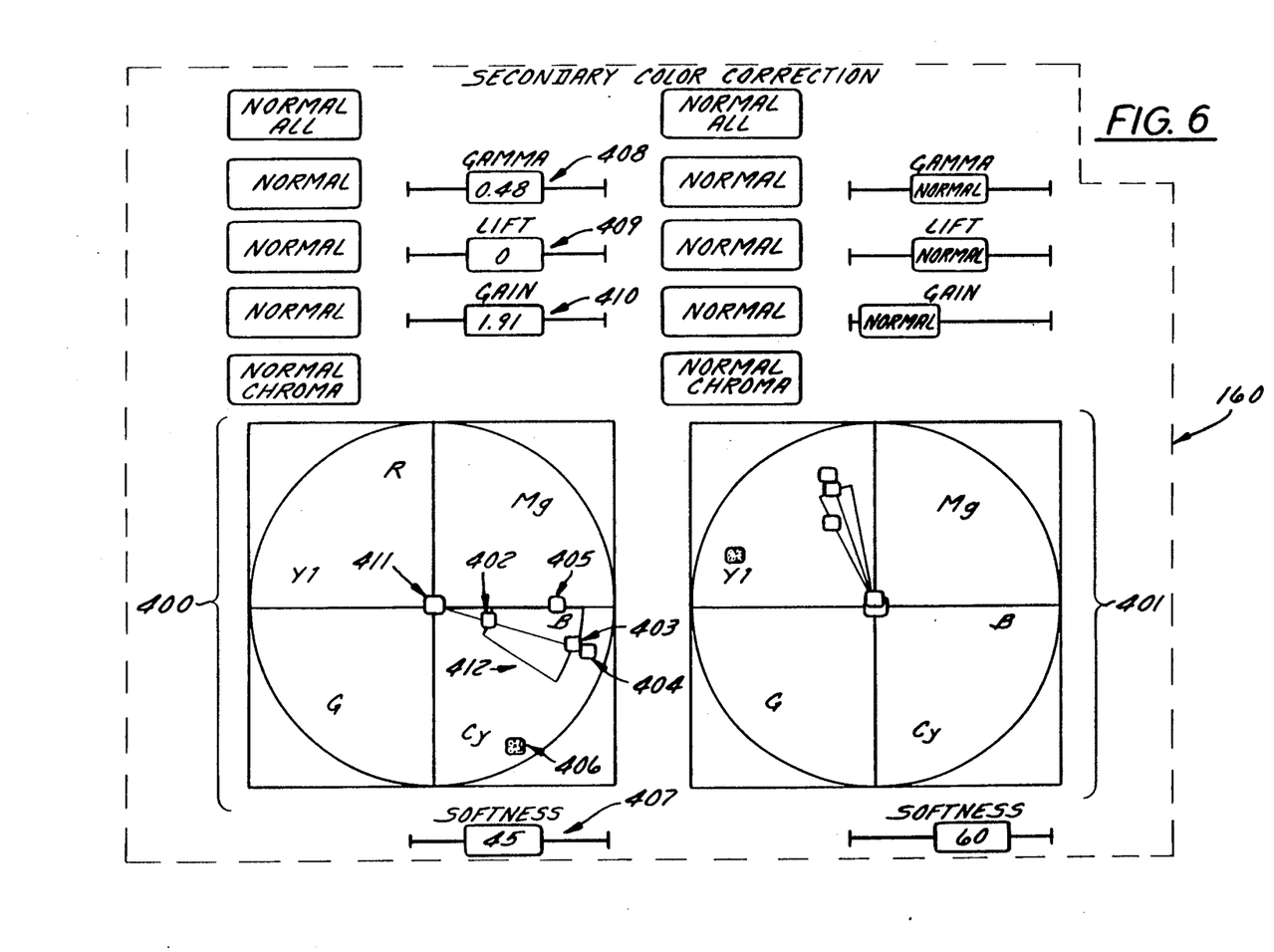
FIG. 6 is a second schematic drawing of another software user interface including a vector scope in accordance with other features of the present invention.

With reference to FIG. 6, another schematic drawing of the software user interface including a vector scope 400 and a vector scope 401 displayed on the screen 160 is utilized in a preferred embodiment of the chroma processor 50 in color correction applications. The vector scope 400 allows a circular region (not shown) or a wedge shaped region 412 to be chosen in order to select the color to be changed. The region 412 consists of a main angle 404, a sub-angle 405, an inner radius 402, and an outer radius 403, and a softness control 407. A point 406 determines the new chrominance value for the affected U and V pairs in region 412.

A 16K byte table of alpha values for the color correction application is computed using the wedge model function shown in Appendix B. The 16K byte table provides a mixing weight that is applied to each U and V pair and a corresponding transferred pair that is computed as follows. The processor 150 linearly interpolates between the two U and V pairs so that the lowest alpha value yields the transformed pair and the highest alpha value leads the original pair, with intermediate alpha values producing a corresponding range of values. Thus, the processor 150 computes a 16K byte table of predefined different U and V values or a transformed pair from the table of alpha values and the U and V pairs at the point 406 and the region 412.

The transformed pair is found by geometric rotation and scaling of the original pair. The two vectors given by the outer radius 403 and the replacement U and V value at the point 406 with respect to the origin 411 define the transformation. A rotation through the angle between the vectors is performed, followed by a scaling operation given by the ratio between their magnitudes. Thus, the U and V pair given by the point 403 is transformed to the U and V pair given by the point 406. Each point corresponding to a U and V pair that is to be remapped is transformed in the same manner. The process is then repeated using the parameters for the second color correction such as on display 401. The result of these computations is loaded into the chroma processor look-up table 101.

Multiple, simultaneous, and independent luminance remappings of the input colors based on their U and V pairs is advantageously accomplished by allocating an equal number of luma tables in the luma/alpha look-up table 105 to each of the remappings to be performed. Preferably, the two remappings are supported in the current implementation so that each remapping is assigned 32 luma tables. Only the six most significant bits of the values written to the look-up table 106 are used. The most significant bit selects one of the two remappings, and the five highest order bits of the alpha value computed for each remapping provide the least significant bits.

The luma table corresponding to the highest alpha value is set to identity. The luma table corresponding to the lowest alpha value is computed based on the three luminance controls shown in Appendix C. The software in Appendix C is a C source code for computing this 256 byte luma table. The table selected by intermediate alpha values contain luma values that are interpolated from these two tables. This permits a gradual change in the luma remapping based on the distance of the U and V pair to the wedge shaped control regions.

The softness control 407 allows the softness parameter of the color to be chosen. The softness parameter controls the range of chrominances beyond the specified region whose modified chrominances are computed by interpolating between identity and the chrominances given by the remapping function.

A gamma control 408 selects a gamma value, a lift control and a gain control 410 selects a gain value. Lift, gain, and gamma are all luminance remapping parameters. The luminance values are multiplied by a scalar (gain), and raised or lowered by a fixed value (lift). The gamma parameter controls the distribution of the values over the range. The code that performs this calculation is included in Appendix C.

As can be seen from the descriptions of the software user interfaces for chromakeying and color correcting operations, the design of the chroma processor 50 allows for versatile signal generation. For example, while the discussed software in appendices A, B, and C may only allow approximately five regions to be selected, the upper limit is in theory limited by the number of pixel bits (Y, U and V0 used into the look-up table. While something less than that number is practical, prior art designs which rely on using multipliers and adders need several computer elements to accommodate several regions and are therefore limited by expense. As described above, the use of look-up tables in the signal generator 90 provides a great deal of flexibility and speed in providing the appropriate luminance, chrominance and matte values for the chroma processor 50. Particularly, the above described approach allows a great deal of versatility to be reached. For instance, when deriving a key signal, the keying program may be customized with extreme precision without a need to change the existing hardware. The region chosen may be irregularly shared or perhaps drawn by hand without a need for changing existing hardware. This is not possible with conventional chroma processors.

Ideally, the signal generator 90 would be replaced by a look-up table which would provide four outputs, two for chrominance values, one for luminance value, and one for a key value. The ideal look-up table would be addressed by the chrominance and luminance values. Assuming that the inputs would be 8 bits each, this table would consist of $2^{24}$ entries or over 16 million entries, each containing 4 bytes for a total of 64 megabytes. With such a table, any combination of chrominance and luminance components could be remapped to a unique set of four values—Y, U, V and the key.

It will be understood that while the various data buses are represented in the drawings as single lines, they represent multi-conductor data paths. Further, the above description is of a preferred exemplary embodiment of the present invention, and the invention is not limited to the specific forms shown. For example, while various look-up tables have been shown interconnected in a particular way, the invention is not limited to these particular interconnections and look-up tables. Although the invention is described as employed in a foreground chroma processor, it could be utilized in various parts of the video system. These and other modifications may be made in the design and arrangements of the elements discussed herein without departing from the scope of the invention as expressed in the appended claims.

APPENDIX A

```
#include <math.h>

/* Compute alpha values between 0 and 255 for circular regions
*/ define DATA_BITS    8     /* input range between 0 and 255*/
define MIN_ALPHA    0     /* range of values to be produced*/
#define MAX_ALPHA    255   /*                                */
/* Linear interpolation between A and B, 0<= W <= 1*/
#define LERP(A,B,W)  ((A)+((W)*((B)-(A))))
```

```
#define POWER_OF_TWO(N) ( N ? (1<<N) : 1 )

void circle_model(
  unsigned char *map,   /* result written starting here*/
  int radius,           /* inner circle              */
  int softness,         /* radius+softness= outer circle*/
  int ukey,             /* origin of circle          */
  int vkey,             /*                           */
  int nbits)            /* most significant bits     */
{
  unsigned char   *m;
  int             u, v, vlo, vhi;
  int             du, dv;
  int             pitch=     POWER_OF_TWO(nbits);
  int             shift=     DATA_BITS-nbits;
  int             increment= POWER_OF_TWO(shift);
  int             loop_limit= POWER_OF_TWO(DATA_BITS);
  int             inner, outer;
  float           distance, weight;

inner=   radius;
  inner*=  inner;
  outer=   radius+softness;
  vlo=     vkey-outer;
  vhi=     vkey+outer;
  outer*=  outer;
  memset(map, MAX_ALPHA, POWER_OF_TWO(nbits*2));
  m=       map;
  for(v= 0; v< loop_limit; v+= increment){
    if(v< vlo || v> vhi){  /* If outside range, skip*/
      m+= pitch;
      continue;
    }
    for(u= 0; u< loop_limit; u+= increment){
      du= u-ukey;
      dv= v-vkey;
      distance= (du*du)+(dv*dv);
      if(distance< inner){
        m[0]= MIN_ALPHA;
      }else if(distance> outer){
        m[0]= MAX_ALPHA;
      }else{
        weight= (distance-inner)/(outer-inner);
        m[0]= LERP(MIN_ALPHA, MAX_ALPHA, weight);
      }
      ++m;
    }
  }
}
```

APPENDIX B

```
#include <math.h>

/* Compute alpha values between 0 and 255 for wedge regions
*/ define DATA_BITS    8     /* input range between 0 and 255*/
define MIN_ALPHA    0     /* range of values to be produced*/
#define MAX_ALPHA    255   /*                               */
/* Linear interpolation between A and B, 0<= W <= 1*/
#define LERP(A,B,W)  ((A)+((W)*((B)-(A))))
#define POWER_OF_TWO(N) ( N ? (1<<N) : 1 )

void wedge_model(
unsigned char *map,
float main_angle,
float include_angle,
float softness,         /* 0<= softness <= 1 */
int near_radius,        /* distance from (ukey, vkey]*/
int far_radius,         /* distance from (ukey, vkey]*/
int ukey,
int vkey,
int nbits)
{
unsigned char   *m;
int             u, v;
int             pitch=   POWER_OF_TWO(nbits);
int             shift=   DATA_BITS-nbits;
```

```
int         increment=   POWER_OF_TWO(shift);
int         loop_limit=  POWER_OF_TWO(DATA_BITS);
int         inner, outer;
float       weight;
float       soft= softness*(_PI/4); /* softness scale is arbitrary */
float       x0, y0, x1, y1;
int         iscale, oscale, inner_soft, outer_soft;
int         value;

inner=    near_radius;
x0=       cos(include_angle)*inner;
y0=       sin(include_angle)*inner;
x1=       cos(include_angle+soft)*inner;
y1=       sin(include_angle+soft)*inner;
iscale=   sqrt(((x0-x1)*(x0-x1))+((y0-y1)*(y0-y1)));

outer=    far_radius;
x0=       cos(include_angle)*outer;
y0=       sin(include_angle)*outer;
x1=       cos(include_angle+soft)*outer;
y1=       sin(include_angle+soft)*outer;
oscale=   sqrt(((x0-x1)*(x0-x1))+((y0-y1)*(y0-y1)));

inner_soft=  inner-iscale;
outer_soft=  outer+oscale;
inner_soft*= inner_soft;
outer_soft*= outer_soft;
inner*=      inner;
outer*=      outer;

memset(map, MAX_ALPHA, POWER_OF_TWO(2*nbits));
m= map;
for(v= 0; v< loop_limit; v+= increment){
  float dv, dv2;
  dv= v-vkey;
  dv2= (dv*dv);
  for(u= 0; u< loop_limit; u+= increment){
    float t, du, dt, factor;
    int   distance;

du= u-ukey;
    distance= (du*du)+dv2;
    if(distance< inner_soft || distance> outer_soft){
      value= MAX_ALPHA;
      goto setval;
    }else if(distance< inner){
      factor= (float)(inner-distance)/(inner-inner_soft);
    }else if(distance> outer){
      factor= (float)(distance-outer)/(outer_soft-outer);
    }else{
      factor= -1.;
    }
    t=   atan2(du, dv);
    dt= fabs(t-main_angle);
    if(dt> _PI)
       dt= (2*_PI)-dt;
    if(dt> include_angle+soft){
       value= MAX_ALPHA;
    }else{
       if(dt< include_angle){
         value= MIN_ALPHA;
       }else{
         weight= ((dt-include_angle)/soft);
         value= LERP(MIN_ALPHA, MAX_ALPHA, weight);
       }
       if(factor> 0)   /* outside of range given by inner, outer radii*/
         value= LERP(value, MAX_ALPHA, factor);
    }
setval:
    *m++= value;
  }
}
} include <math.h>

/*   0< gamma < 2
     *   0<= gain < 4
```

```
 *    -256 < lift < 256
 *
 *    compute 256 entry luma table
 */ void compute_luma_table(unsigned char *table, float gamma, float gain, float lift)
{
    int i;

for(i= 0; i< 256; ++i){
        int val= ((255*gain*pow((float)i, gamma))/pow(255., gamma))+lift;
        if(val< 0)
            val= 0;
        else if(val> 255)
            val= 255;
        table[i]= val;
    }
}
```

We claim:

1. A digital chroma processor for providing first output chrominance signals and second output chrominance signals in response to first input chrominance signals and second input chrominance signals, the chroma processor comprising:

means for selecting color modification parameters;

chrominance look-up table means for storing data representative of the first output chrominance signals and the second output chrominance signals, wherein the chrominance look-up table means is configured to address the data and provide the first output chrominance signals and the second output chrominance signals in response to application of the first input chrominance signals and the second input chrominance signals to the look-up table means wherein the first output chrominance signals and the second output chrominance signals are predefined; and processing means for configuring the data representative of the first output chrominance signals and the second output chrominance signals in the look-up table means in accordance with the color modification parameters.

2. The chroma processor of claim 1 wherein the means for selecting color modification parameters comprises a software user interface.

3. The chroma processor of claim 2 wherein the software user interface includes a flare suppression control for selecting at least one color modification parameter.

4. The chroma processor of claim 2 wherein said software user interface includes a vector scope for selecting the color modification parameters.

5. The chroma processor of claim 4 wherein the user interface is configured for selecting wedge-shaped or circular regions from the vector scope.

6. The chroma processor of claim 1 further comprising:

key look-up table means for holding key signals for the first input chrominance signals and the second input chrominance signals, the key look-up table means providing the key signals when addressed by the first input chrominance signals and the second input chrominance signals;

wherein the processing means generates the key signals in accordance with the selected color modification parameters for the first input chrominance signals and the second input chrominance signals, the processing means loading the key look-up table means with the key signals.

7. The chroma processor of claim 1, wherein the first input chrominance signals and the second input chrominance signals are U and V chrominance signals.

8. The chroma processor of claim 1, wherein the chrominance look-up table means includes a first address input which receives the first input chrominance signals and the second input chrominance signals, a data input coupled to the processing means, and a second address input coupled to the processing means.

9. The chroma processor of claim 8, wherein the means for selecting color modification parameters includes a flare suppression control and the processing means generates the first output chrominance signals and the second output chrominance signals in accordance with flare suppression parameters provided by the flare suppression control.

10. A digital chroma processor for generating first key signals in response to first chrominance signals, and second chrominance signals, the chroma processor comprising:

user interface means for selecting color modification parameters;

memory means for holding the first key signals for the first and second chrominance signals, the memory means providing the first key signals when addressed by the first and second chrominance signals; and processing means for generating the first key signals in accordance with the selected color modification parameters, the processing means loading the memory means with the first key signals.

11. The digital chroma processor of claim 10 wherein the digital chroma processor further receives luminance signals, and wherein the memory means is further addressed by the luminance signals.

12. The chroma processor of claim 10 wherein the digital chroma processor further receives luminance signals, and the digital chroma processor further comprises:

addressing means for providing address signals in response to the first key signals and the luminance signals; and second memory means for storing second key signals, the second memory means providing the second key signals when addressed by the address signals, the processing means generating the second key signals in accordance with the selected color modification parameters and loading the second memory means with the second key signals.

13. The digital chroma processor of claim 12 wherein the addressing means generates the address signals b concatenating a plurality of most significant bits from the first key signals and a plurality of most significant bits from the luminance signals.

14. The digital chroma processor of claim 12 wherein the addressing means is comprised of conductors coupled to the memory means and the second memory means.

15. The chroma processor of claim 10 wherein the user interface means is a software user interface.

16. The chroma processor of claim 10 wherein the user interface means includes a softness control for selecting at least one color modification parameter.

17. The chroma processor of claim 10, further comprising a second memory means for storing new key signals, the second memory means providing the new key signals when addressed by address signals;
   a matte signal input for receiving second key signals; and
   a multiplexer for receiving the second key signals from said matte signal input and the first key signals from the memory means, the multiplexer selecting the second key signals or the first key signals to provide the address signals, the processing means generating the new key signals for a plurality of values of the first key signals and second key signals and loading the second memory means with the new key signals.

18. A digital chroma processor for providing new luminance signals in response to first chrominance signals, second chrominance signals, and luminance signals, the chroma processor comprising:
   means for generating color modification parameters;
   first look-up table means for storing the new luminance signals for a plurality of the first chrominance signals, the second chrominance signals, and the luminance signals, the first look-up table means providing the new luminance signals when addressed by the first and second chrominance signals and the luminance signals; and
   processing means for generating the new luminance signals in accordance with the color modification parameters and loading the first look-up table means with the new luminance signals.

19. The chroma processor of claim 18 wherein the means for generating color modification parameters includes a luminance control.

20. The chroma processor of claim 19, wherein the means for generating color modification parameters includes a softness control for providing one of the color modification parameters.

21. The chroma processor of claim 19, further comprising:
   a luminance input for receiving the luminance signals; and
   a multiplexer having a first input coupled to the luminance input and a second input coupled to the first look-up table means, the multiplexer conveying the luminance signals or the new luminance signals in response to a control signal.

22. A digital chroma processor, comprising:
   a first input for receiving first chrominance values;
   a second input for receiving second chrominance values;
   a user interface;
   a processor coupled to the user interface, wherein the processor produces a new first chrominance value and a new second chrominance value for each first and second chrominance value in a set of first and second chrominance values in response to commands from the user interface;
   a memory having data outputs and first address inputs and data inputs, the first address inputs and data inputs coupled to the processor, the memory storing the new first and new second chrominance values on the data inputs for each first and second chrominance value in the set of first and second chrominance values at memory locations addressed by corresponding ones of the first and second chrominance values of the set of the first and second chrominance values, the memory having second address inputs coupled to the first input and the second input for receiving the first and second chrominance values, the memory providing the new first and second chrominance values at the data outputs in response to the first and second chrominance values on the second address inputs.

23. The chroma processor of claim 22 further comprising:
   a key memory having key data outputs and first key address inputs, second key address inputs and key data inputs, the first key address inputs and key data inputs being coupled to the processor, the key memory storing key values on the key data inputs at locations addressed by a second set of the first and second chrominance values, the key memory having the second key address inputs coupled to the first input and the second input, the key memory providing the key values on the key data outputs in response to the first and second chrominance values on the second key address inputs, the processor including an algorithm for producing the key values for each first and second chrominance value in the second set.

24. The chroma processor of claim 23 further comprising:
   a third input for receiving an original key signal; and
   a key multiplexer having a first multiplexer input coupled to the key data outputs and a second multiplexer input coupled to the third input, the key multiplexer having a control input for selecting the key values or the original key signal.

25. The chroma processor of claim 23 wherein the memory is a dual port SRAM.

26. A digital chroma processor, comprising:
   a first input for receiving first chrominance values;
   a second input for receiving second chrominance values;
   a user interface;
   a processor coupled to the user interface, wherein the processor produces key values for each first and second chrominance value in a set of first and second chrominance values in response to commands from the user interface;
   a memory having data outputs and first address inputs and data inputs, the first address inputs and the data inputs being coupled to the processor, the memory storing the key values on the data inputs for each first and second chrominance value in the set of first and second chrominance values at memory locations addressed by corresponding ones of the first and second chrominance values of the set of the first and second chrominance values, the memory having second address inputs coupled to the first and second inputs, the memory providing the key values at the data outputs in response to the first and second chrominance values on the second address inputs.

27. The digital chroma processor of claim 26 further comprising:
   a third input for receiving luminance values;

a key memory having key data outputs and first key address inputs, and key data inputs, the key data inputs and first key address inputs being coupled to the processor, the key memory storing second key values on the key data inputs at memory locations addressed by a second set of the key values and the luminance values, the key memory having second key address inputs coupled to the data outputs of the memory and the third input, the key memory providing the second key values on the key data outputs in response to the key values and the luminance values on the second key address inputs;

the processor including an algorithm for producing the second key value for each key value and luminance value in the second set.

28. The digital chroma processor of claim 26 further comprising:

a third input for receiving an original key signal; and a key multiplexer having a first input coupled to the key data outputs and a second input coupled to the third input, the key multiplexer having a control input for selecting the key values or the original key signal.

29. A digital chroma processor for providing first output chrominance signals and second output chrominance signals in response to first input chrominance signals and second input chrominance signals, the chroma processor comprising:

a user interface;

a processor;

a memory, the memory storing the first output chrominance signals and the second output chrominance signals, the memory providing the first output chrominance signals and the second output chrominance signals in response to the first input chrominance signals and the second input chrominance signals; and wherein the processor is coupled to the user interface, the processor producing the first output chrominance signals and the second output chrominance signals for storage in the memory in response to commands from the user interface.

30. A digital chroma processor for generating key signals in response to first input chrominance signals and second input chrominance signals, the chroma processor comprising:

a user interface;

a processor;

a memory, the memory storing the key signals, the memory providing the key signals in response to the first input chrominance signals and the second input chrominance signals; and wherein the processor is coupled to the user interface, the processor producing the key signals for storage in the memory in response to commands from the user interface.

31. A digital chroma processor for generating key signals in response to input luminance signals, the chroma processor comprising:

a user interface;

a processor;

a memory, the memory storing the key signals, the memory providing the key signals in response to the input luminance signals; and wherein the processor is coupled to the user interface, the processor producing the key signals for storage in the memory in response to commands from the user interface.

* * * * *